United States Patent
Jang et al.

(10) Patent No.: US 10,461,350 B2
(45) Date of Patent: Oct. 29, 2019

(54) ELECTROCHEMICAL REACTION CELL ENHANCING REDUCTION REACTION

(71) Applicant: KOREA INSTITUTE OF SCIENCE AND TECHNOLOGY, Seoul (KR)

(72) Inventors: Jong Hyun Jang, Seoul (KR); Hyoung-Juhn Kim, Seoul (KR); Sung Jong Yoo, Seoul (KR); Jin Young Kim, Seoul (KR); Hyung Chul Ham, Seoul (KR); Dirk Henkensmeier, Seoul (KR); So Young Lee, Seoul (KR); Hyun Seo Park, Seoul (KR); Youngseung Na, Seoul (KR); Min Gwan Ha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 189 days.

(21) Appl. No.: 15/686,689

(22) Filed: Aug. 25, 2017

(65) Prior Publication Data

US 2018/0138534 A1    May 17, 2018

(30) Foreign Application Priority Data

Nov. 11, 2016 (KR) .................. 10-2016-0150638

(51) Int. Cl.
  *C25B 3/04* (2006.01)
  *C25B 13/08* (2006.01)
  (Continued)

(52) U.S. Cl.
  CPC ......... *H01M 8/1018* (2013.01); *H01M 8/006* (2013.01); *H01M 8/0276* (2013.01); *H01M 2008/1095* (2013.01)

(58) Field of Classification Search
  CPC ............ H01M 8/1009; H01M 8/0258; H01M 8/0271; H01M 8/0276; H01M 8/006;
  (Continued)

(56) References Cited

U.S. PATENT DOCUMENTS

| | | | |
|---|---|---|---|
| 7,488,547 B1 * | 2/2009 | Iacovelli | H01M 4/8626 429/434 |
| 2011/0244364 A1 * | 10/2011 | Enayetullah | H01M 4/8663 429/487 |

(Continued)

FOREIGN PATENT DOCUMENTS

JP    2012-072477 A    4/2012

OTHER PUBLICATIONS

Byoungsu Kim et al., "Influence of dilute feed and pH on electrochemical reduction of $CO_2$ to CO on Ag in a continuous flow electrolyzer", Electrochimica Acta, 2015, pp. 271-276, vol. 166.

(Continued)

*Primary Examiner* — Lisa S Park
(74) *Attorney, Agent, or Firm* — Rabin & Berdo, P.C.

(57) ABSTRACT

Disclosed is an electrochemical reaction cell enhancing a reduction reaction. The electrochemical reaction cell enhancing a reduction reaction comprises: a membrane electrode assembly including a polymer electrolytic membrane, a cathode formed by sequentially stacking a first gas diffusion layer and a first catalyst layer on one surface of the electrolytic membrane, and an anode formed by sequentially stacking a second catalyst layer and a second gas diffusion layer on the other surface of the electrolytic membrane; a first distribution plate stacked on the first catalyst layer to supply a reaction gas and a cathode electrolytic solution dissolved with the reaction gas to the first catalyst layer along separate channels; and a second distribution plate (Continued)

stacked on the second gas diffusion layer to supply an anode electrolytic solution to the second gas diffusion layer.

10 Claims, 12 Drawing Sheets

(51) Int. Cl.
*C25B 11/04* (2006.01)
*C25B 9/08* (2006.01)
*H01M 8/1018* (2016.01)
*H01M 8/00* (2016.01)
*H01M 8/0276* (2016.01)

(58) Field of Classification Search
CPC ........ H01M 2008/1095; H01M 8/1018; C25B 3/04; C25B 13/08; C25B 11/04; C25B 11/035; C25B 9/08
See application file for complete search history.

(56) References Cited

U.S. PATENT DOCUMENTS

| | | | |
|---|---|---|---|
| 2015/0202621 A1* | 7/2015 | Sabate Vizcarra .. | H01M 8/1009 429/2 |
| 2016/0017503 A1* | 1/2016 | Kaczur ..................... | C25B 3/12 205/346 |
| 2016/0108530 A1* | 4/2016 | Masel ...................... | B01J 41/14 204/265 |
| 2017/0321333 A1* | 11/2017 | Kuhl ......................... | C25B 3/04 |

OTHER PUBLICATIONS

Eric J. Dufek et al., "Bench-scale electrochemical system for generation of CO and syn-gas", J. Appl Electrochem, 2011, pp. 623-631, vol. 41.

Charles Delacourt et al., "Design of an Electrochemical Cell Making Syngas (CO + $H_2$) from $CO_2$ and $H_2O$ Reduction at Room Temperature", Journal of the Electrochemical Society, 2008, pp. B42-B49, vol. 155, No. 1.

* cited by examiner

ELECTROCHEMICAL REACTION CELL ENHANCING REDUCTION REACTION

CROSS-REFERENCE TO RELATED APPLICATION

This application claims priority under 35 U.S.C. § 119 to Korean Patent Application No. 10-2016-0150638 filed on Nov. 11, 2016 in the Korean Intellectual Property Office, the disclosure of which is incorporated herein by reference in its entirety.

TECHNICAL FIELD

The present disclosure relates to an electrochemical reaction cell which enhances the reduction efficiency, and more particularly, to an electrochemical reaction cell which enhances a reduction reaction by maximizing a three-phase interface where a reaction gas and a cathode electrolytic solution encounter a catalyst layer at a cathode.

BACKGROUND

Currently, carbon dioxide is a greenhouse gas that causes global warming, and should be reduced. Carbon dioxide may be reduced by means of trapping, chemical conversion or electrochemical conversion. Among them, the electrochemical conversion method may precisely control components so that other synthesis gases may be produced, and thus may give better economic benefits than merely removing carbon dioxide.

In general, an electrochemical reaction cell includes a cathode, an anode and an electrolyte. The electrolyte is classified into a solid electrolyte and a liquid electrolyte, and in some cases, both of solid and liquid electrolytes are used at the same time. The electrolyte may be classified into a cation exchange electrolyte and an anion exchange electrolyte, and a fluorine-based cation exchange membranes (Nafion) commonly used in fuel cells is a technically verified solid electrolyte.

In the case of the cation exchange membrane, which is widely used in the electrolysis of water as well as fuel cells, oxygen is generated when water is supplied to the anode, hydrogen is decomposed into electrons and protons, the protons move to a cathode through the cation exchange membrane, and the electrons move to the cathode through an external circuit to synthesize hydrogen gas.

Along with this reaction, if carbon dioxide ($CO_2$) and $KHCO_3$ electrolytic solution are supplied to the cathode, proton and carbon dioxide encounter each other to produce carbon monoxide and water. Since this is an electrochemical reaction, it is possible to easily control an amount of generated carbon monoxide and a hydrogen/carbon dioxide ratio by changing a voltage.

However, different from other fuel cells or water electrolytic cells, the electrochemical carbon dioxide reduction reaction requires a large contact area where the $KHCO_3$ electrolytic solution and carbon dioxide ($CO_2$) make contact with the catalyst at the same time. Thus, in the existing mixing and supplying method, there is a loss in the reaction area.

Thus, in the existing technique, $KHCO_3$ electrolytic solution and carbon dioxide were mixed and supplied to increase a two-phase flow and a reaction area of the catalyst. However, in this case, liquid and gas are irregularly supplied to the cells due to surface tension, and if electrochemical reaction cells are stacked and used, the efficiency is remarkably lowered in comparison to the case where a single cell is used. In addition, in the existing technique, $KHCO_3$ electrolytic solution and carbon dioxide were separately supplied and then mixed in a channel through a mesh made of a porous material. However, in this case, to control flow direction of carbon dioxide gas is difficult at a large area, so that the efficiency of the reduction reaction of carbon dioxide is lowered. In addition, in the existing technique, micro flows are controlled so that the $KHCO_3$ electrolytic solution and carbon dioxide encounter at the catalyst layer without using the hydrogen gas exchange membrane. However, in this case, the cation exchange membrane is not used, so that it is difficult to increase the efficiency by pressurization, and it is difficult to maintain the micro flows in a large area. Thus, this is not available for mass-producing or stacking cells.

Therefore, there is required research for improving the reduction reaction of carbon dioxide by maximizing the a three-phase interface where $KHCO_3$ electrolytic solution and carbon dioxide encounter a catalyst layer directly while using a cation exchange membrane.

RELATED LITERATURES

Non-Patent Literature

[Literature 1] Design of an Electrochemical Cell Making Syngas (CO+$H_2$) from $CO_2$ and $H_2O$ Reduction at Room Temperature, *Journal of The Electrochemical Society* (2008) 155:B42-B49

[Literature 2] Bench-scale electrochemical system for generation of CO and syngas, *Journal of Applied Electrochemistry* (2011) 41:623631

[Literature 3] Influence of dilute feed and pH on electrochemical reduction of $CO_2$ to CO on Ag in a continuous flow electrolyzer, *Electrochimical Acta* (2015) 166:271-276

SUMMARY

Therefore, the present disclosure is directed to providing an electrochemical reaction cell which enhances a reduction reaction by maximizing a three-phase interface where a reaction gas and a cathode electrolytic solution encounter a catalyst layer at a cathode.

In one aspect of the present disclosure, there is provided an electrochemical reaction cell enhancing a reduction reaction, comprising: a membrane electrode assembly including a polymer electrolytic membrane, a cathode formed by sequentially stacking a first gas diffusion layer and a first catalyst layer on one surface of the electrolytic membrane, and an anode formed by sequentially stacking a second catalyst layer and a second gas diffusion layer on the other surface of the electrolytic membrane; a first distribution plate stacked on the first catalyst layer to supply a reaction gas and a cathode electrolytic solution mixed with the reaction gas to the first catalyst layer along separate channels, so that the cathode electrolytic solution penetrates and diffuses the first catalyst layer and the first gas diffusion layer to encounter the reaction gas at the first catalyst layer which is in contact with the channel to which the reaction gas is supplied to form a three-phase interface; and a second distribution plate stacked on the second gas diffusion layer to supply an anode electrolytic solution to the second gas diffusion layer.

The first distribution plate may include: a plurality of micro channels arranged to cross each other in a latch form so that the cathode electrolytic solution is supplied thereto and accommodated therein, the micro channels being opened at one side which is in contact with the first catalyst layer; and a main channel continuously formed between the plurality of micro channels in a zigzag form so that the reaction gas flows therein, the main channel being opened at one side which is in contact with the first catalyst layer, wherein the cathode electrolytic solution accommodated in the micro channels penetrates through the first catalyst layer and the first gas diffusion layer and diffuses to the main channel adjacent thereto, and then encounters the reaction gas at the first catalyst layer to form a three-phase interface.

The first gas diffusion layer may be made of carbon porous fiber.

The first gas diffusion layer may be made of carbon porous fiber coated with a silver (Ag) catalyst.

The electrochemical reaction cell may further include a first sealing member provided between the first distribution plate and the first catalyst layer to seal the first distribution plate and the first catalyst layer from each other.

The second distribution plate may include a channel continuously formed in a zigzag form so that the anode electrolytic solution flows therein, the channel being opened at one side which is in contact with the second gas diffusion layer, and the anode electrolytic solution may penetrate and diffuse through the second gas diffusion layer and then is supplied to the second catalyst layer.

The second gas diffusion layer may be made of titanium sintered foam.

The second gas diffusion layer may be made of titanium sintered foam coated with an iridium oxide ($IrO_2$) catalyst.

The electrochemical reaction cell may further include a second sealing member provided between the second distribution plate and the membrane to seal the second distribution plate and the second gas diffusion layer from each other.

The electrochemical reaction cell may further include a first end plate stacked on an outer side of the first distribution plate to supply the reaction gas and the cathode electrolytic solution mixed with the reaction gas to the first distribution plate and to discharge a product gas generated by reacting with protons penetrating the electrolytic membrane along with an unreacted reaction gas and an unreacted cathode electrolytic solution; and a second end plate stacked on an outer side of the second distribution plate to supply the anode electrolytic solution to the second distribution plate and discharge an unreacted anode electrolytic solution and oxygen gas.

According to an embodiment of the present disclosure, a reaction gas and a cathode electrolytic solution mixed with the reaction gas are supplied to a first catalyst layer of a cathode along separate channels, the cathode electrolytic solution mixed with the reaction gas encounters the first catalyst layer to form a three-phase interface, and the cathode electrolytic solution penetrates and diffuses through the first catalyst layer and a first gas diffusion layer to encounter the reaction gas at the first catalyst layer which is in contact with the channel to which the reaction gas is supplied to form a three-phase interface, so that the three-phase interface where the cathode electrolytic solution and the reaction gas encounter the catalyst layer is maximize to enhance the reduction reaction at the cathode.

In addition, in an embodiment of the present disclosure, in an electrochemical reaction cell stack in which a plurality of electrochemical reaction cells are stacked, the flow of a reaction gas and an electrolytic solution mixed with the reaction gas, supplied to the first catalyst layer along channels separately formed at the first distribution plate, may be controlled, so that the reaction gas and the cathode electrolytic solution mixed with the reaction gas may be uniformly supplied to each electrochemical reaction cell, thereby enhancing the efficiency of the electrochemical reaction cell stack.

DETAILED DESCRIPTION OF EMBODIMENTS

Figure 1:
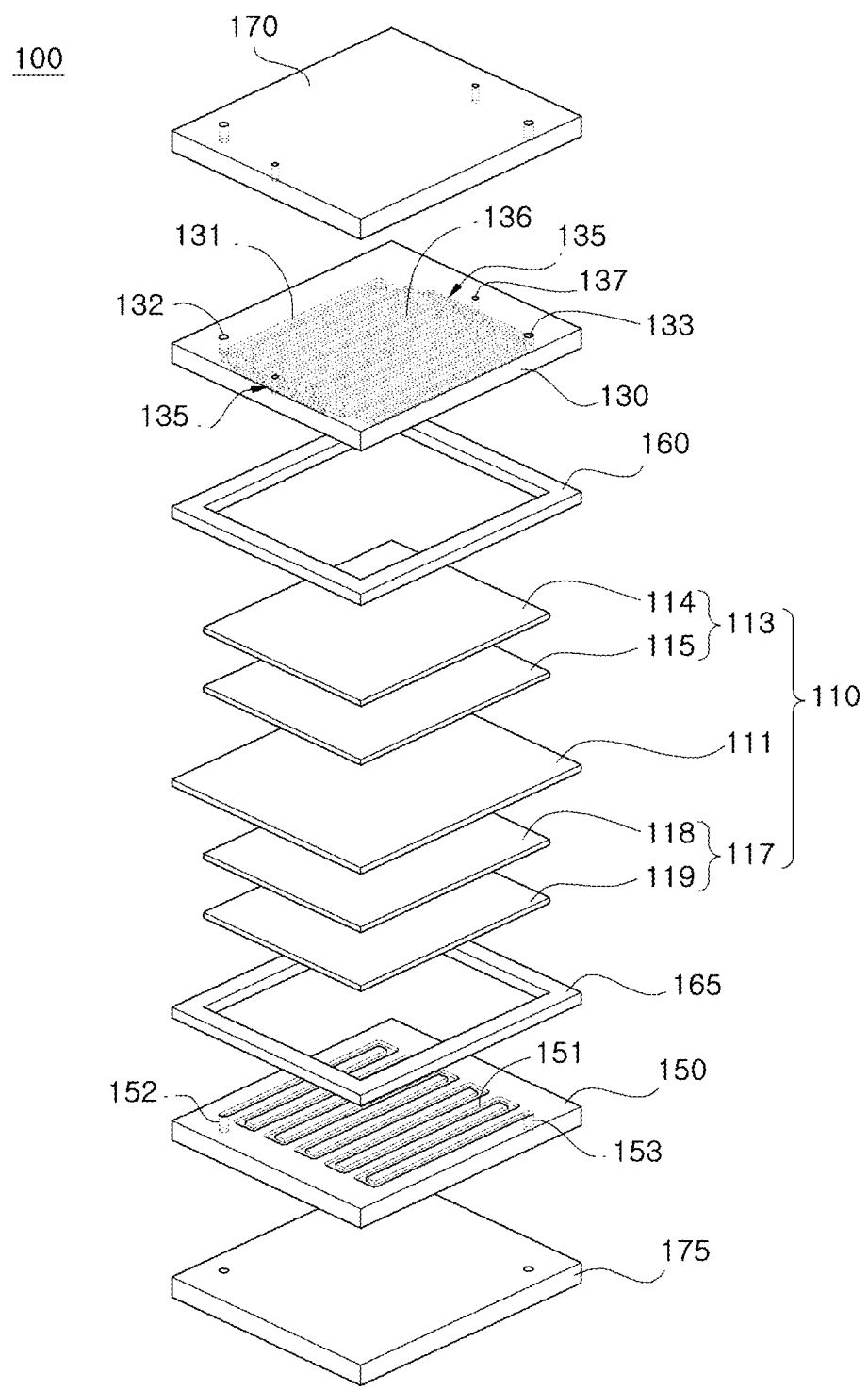
FIG. 1 is an exploded perspective view showing an electrochemical reaction cell according to an embodiment of the present disclosure.

In order to fully understand the operational advantages of the present disclosure and the object achieved by the implementation of the present disclosure, the accompanying drawings illustrating embodiments of the present disclosure and the contents disclosed in the accompanying drawings should be referred to.

Hereinafter, the present disclosure will be described in detail by explaining embodiments of the present disclosure with reference to the accompanying drawings. Like reference signs in the drawings denote like elements.

Figure 2A:
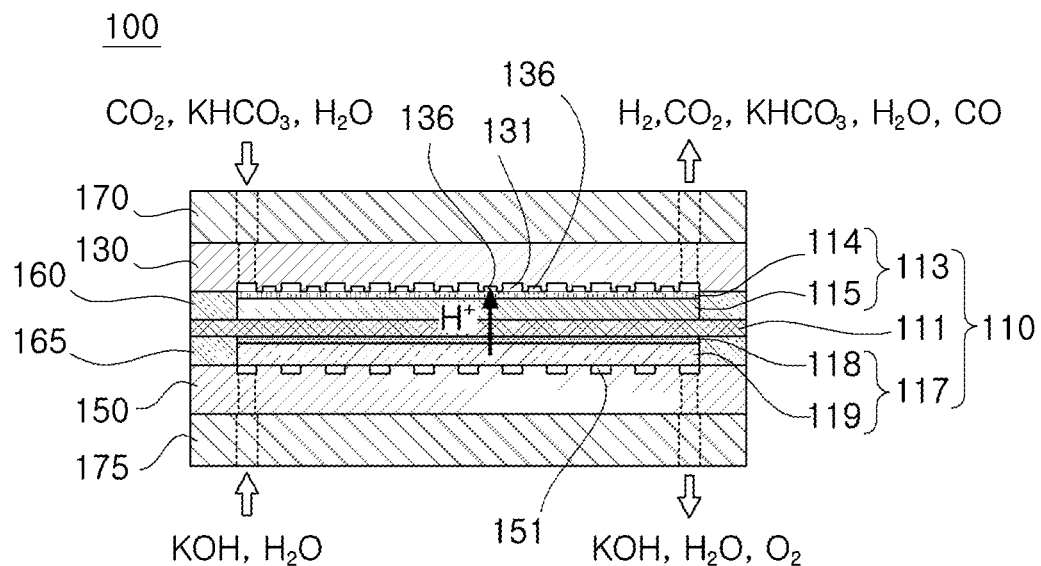
FIGS. 2A to 2D are cross-sectional views showing the electrochemical reaction cell according to an embodiment of the present disclosure.
Figure 2B:
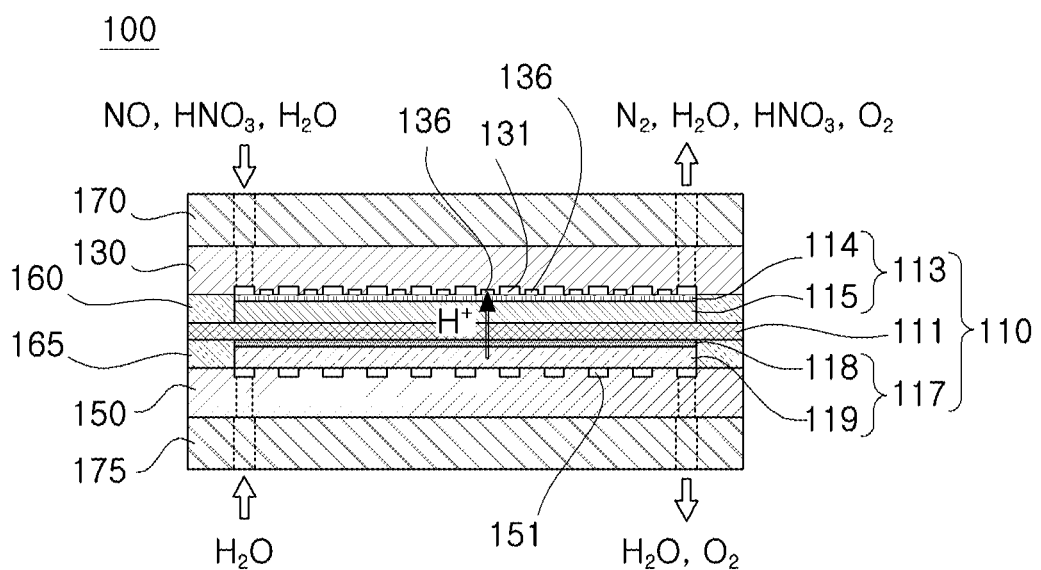
Figure 2C:
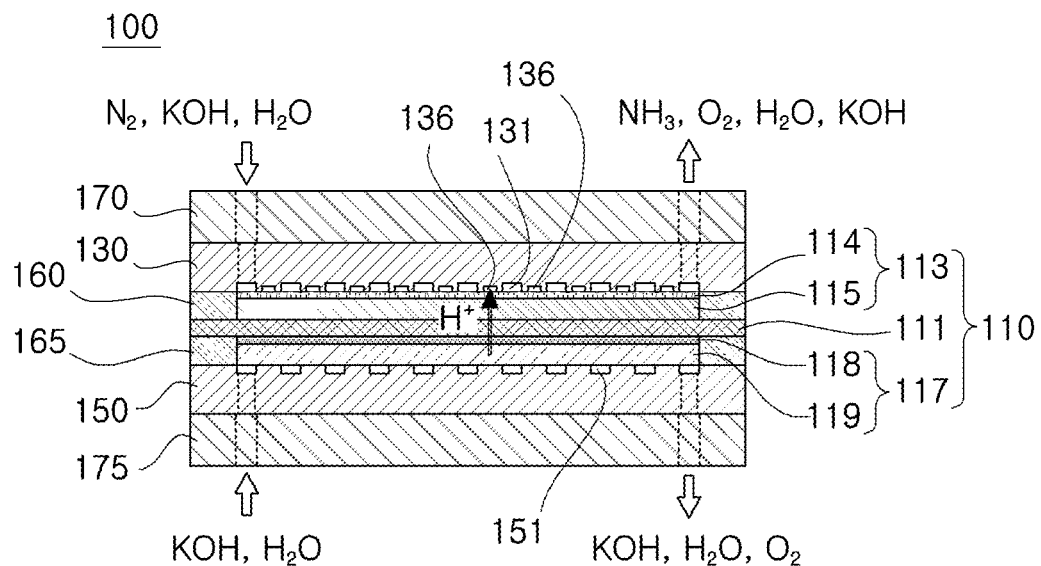
Figure 2D:
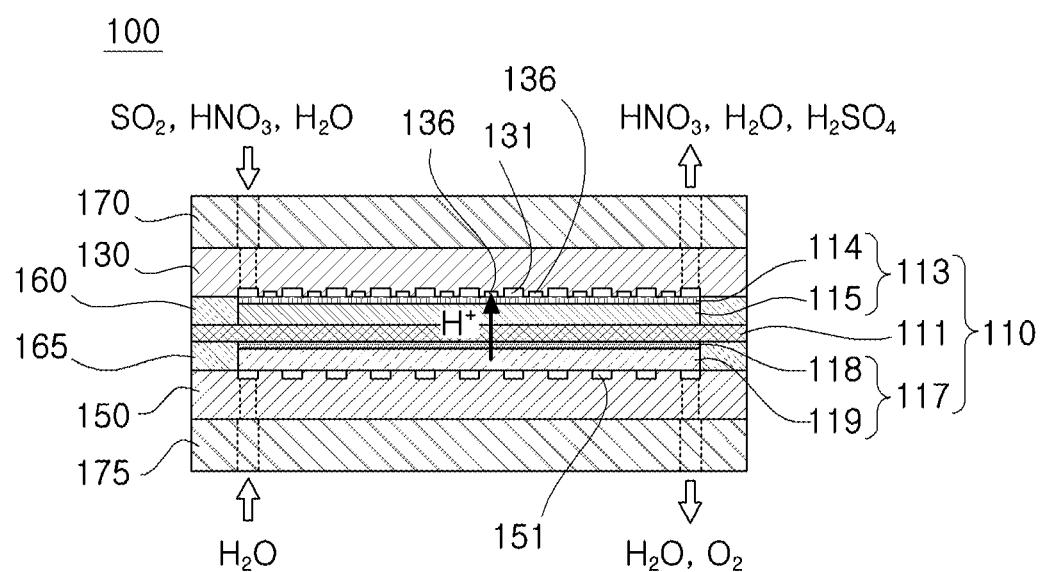
Figure 3:
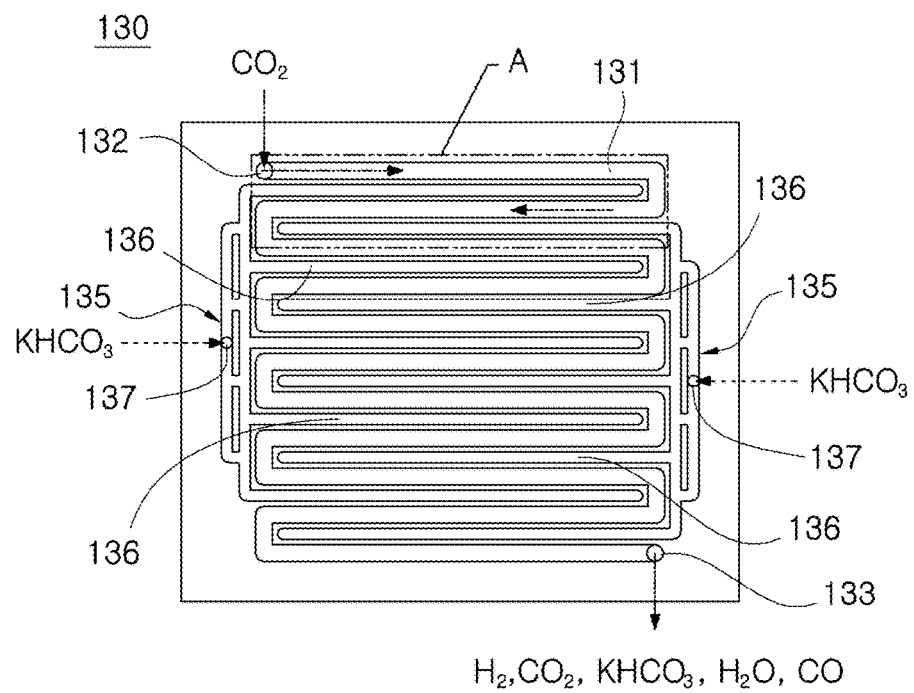
FIG. 3 is a plane view showing a first distribution plate according to an embodiment of the present disclosure.
Figure 4:
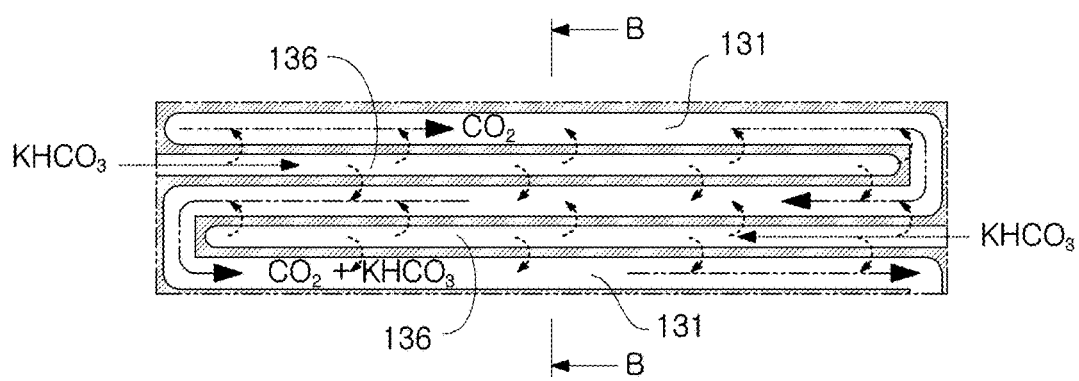
FIG. 4 is a plane view showing a main channel and micro channels by depicting a portion A of FIG. 3 as an enlarged form.
Figure 5:
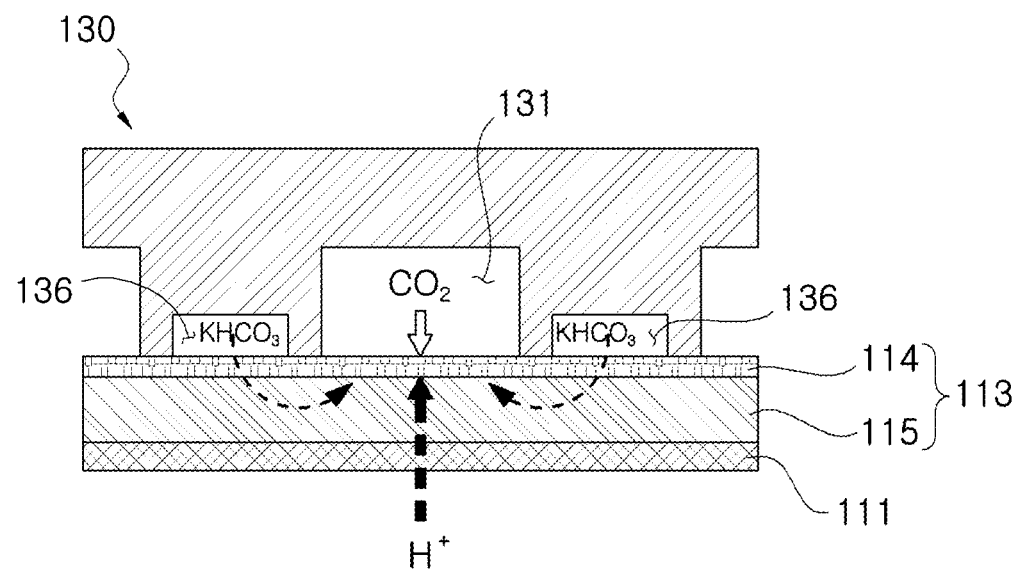
FIG. 5 is a cross-sectional view showing the main channel and the micro channels by depicting a portion B of FIG. 4 as an enlarged form.
Figure 6:
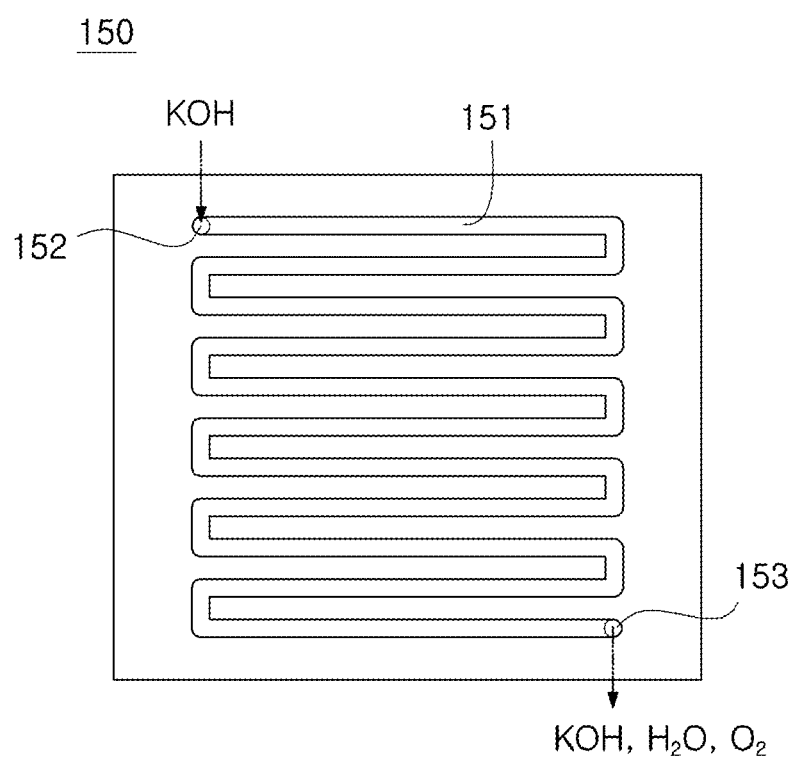
FIG. 6 is a plane view showing a second distribution plate according to an embodiment of the present disclosure.

FIG. 1 is an exploded perspective view showing an electrochemical reaction cell according to an embodiment of the present disclosure, FIG. 2 is a cross-sectional view showing the electrochemical reaction cell according to an embodiment of the present disclosure, FIG. 3 is a plane view showing a first distribution plate according to an embodiment of the present disclosure, FIG. 4 is a plane view showing a main channel and micro channels by depicting a portion A of FIG. 3 as an enlarged form, FIG. 5 is a cross-sectional view showing the main channel and the micro channels by depicting a portion B of FIG. 4 as an enlarged form, and FIG. 6 is a plane view showing a second distribution plate according to an embodiment of the present disclosure.

Referring to FIGS. 1 and 2, an electrochemical reaction cell 100 enhancing a reduction reaction according to the present disclosure includes a membrane electrode assembly 110 having a polymer electrolytic membrane 111 (for example, a cation exchange membrane), a cathode 113 stacked on one side of the electrolytic membrane 111 and an anode 117 stacked on the other side of the electrolytic membrane 111, a first distribution plate 130 stacked on the membrane electrode assembly 110 to supply a reaction gas and a cathode electrolytic solution mixed with the reaction gas to the cathode 113, a second distribution plate 150 stacked on the anode 117 to supply an anode electrolytic solution to the anode 117, a first sealing member 160 provided between the first distribution plate 130 and the cathode 113 to seal the first distribution plate 130 and the cathode 113 from each other, a second sealing member 165 provided between the second distribution plate 150 and the anode 117 to seal the second distribution plate 150 and the anode 117 from each other, a first end plate 170 stacked on the first distribution plate 130, and a second end plate 175 stacked on the second distribution plate 150.

In the membrane electrode assembly 110, the cathode 113 is stacked on one side of the electrolytic membrane 111, and the anode 117 is stacked on the other side of the electrolytic membrane 111, so that the electrolytic membrane 111 is interposed between them.

In this embodiment, the cathode 113 includes a first gas diffusion layer 115 stacked on one side of the electrolytic membrane 111 and a first catalyst layer 114 sequentially stacked on the first gas diffusion layer 115. In other words, in this embodiment, in the cathode 113, the first gas diffusion layer 115 and the first catalyst layer 114 are sequentially stacked on one side of the electrolytic membrane 111. This is directed to enhancing a reaction gas selecting reaction by increasing a moving distance of cation (specifically, proton) penetrating the electrolytic membrane 111 as much as the thickness of the first gas diffusion layer 115 stacked between the electrolytic membrane 111 and the first catalyst layer 114. In addition, the first gas diffusion layer 115 is deposited between the electrolytic membrane 111 and the first catalyst layer 114 to maximize a three-phase interface where the reaction gas and the cathode electrolytic solution encounters the first catalyst layer 114, as described later.

The first gas diffusion layer 115 according to this embodiment may be made of a carbon porous fiber material or a carbon porous fiber material coated with a silver (Ag) catalyst.

The porous structure used for the first gas diffusion layer 115 includes, for example, porous fiber (porous cloth), porous paper, mesh, foam or the like, and the material may be carbon, titanium, nickel, gold, silver or the like.

The first catalyst layer 114 according to this embodiment may be any one selected from the group consisting of silver, gold, platinum, palladium, and mixtures thereof.

In addition, the first distribution plate 130 is stacked on the first catalyst layer 114 to supply the reaction gas and the cathode electrolytic solution dissolved with the reaction gas to the first catalyst layer 114 along separate channels.

For reference, FIG. 2(A) shows an electrochemical reaction cell 100 for reducing carbon dioxide ($CO_2$). Here, the reaction gas is carbon dioxide ($CO_2$), the cathode electrolytic solution includes a $KHCO_3$ solution, and the anode electrolytic solution includes a KOH solution. In addition, FIG. 2(B) shows an electrochemical reaction cell 100 for reducing nitrogen monoxide (NO). Here, the reaction gas is nitrogen monoxide (NO), the cathode electrolytic solution is a $HNO_3$ solution, and the anode electrolytic solution contains water ($H_2O$). Moreover, FIG. 2(C) shows an electrochemical reaction cell 100 for reducing nitrogen ($N_2$). Here, the reaction gas is nitrogen ($N_2$), the cathode electrolytic solution includes a KOH solution, and the anode electrolytic solution includes a KOH solution. In addition, FIG. 2(D) shows an electrochemical reaction cell 100 for reducing sulfur dioxide ($SO_2$). Here, the reaction gas is sulfur dioxide ($SO_2$), the cathode electrolytic solution includes $HNO_3$ solution, and the anode electrolytic solution contains water ($H_2O$).

Hereinafter, the electrochemical reaction cell 100 enhancing a reduction reaction according to an embodiment of the present disclosure will be described in detail, based on a carbon dioxide reduction reaction as an example.

Referring to FIGS. 3 to 5, in detail, the first distribution plate 130 includes a plurality of micro channels 136 arranged to cross each other in a latch form so that the cathode electrolytic solution (for example, a $KHCO_3$ solution) dissolved with a reaction gas (for example, $CO_2$) is supplied thereto and accommodated therein, the micro channels 136 being opened at one side which is in contact with the first catalyst layer, and a main channel 131 continuously formed between the plurality of micro channels 136 in a zigzag form so that a reaction gas ($CO_2$) flows therein, the main channel 131 being opened at one side which is in contact with the first catalyst layer 114.

Each of the plurality of micro channels 136 is formed in a channel structure which is opened at one side which is in contact with the first catalyst layer 114. In addition, the plurality of micro channels 136 are arranged to cross each other in a latch form. In other words, the plurality of micro channels 136 are alternately arranged.

As shown in FIG. 3, the plurality of micro channels 136 may be arranged at both sides by forming two unit micro channels 135, respectively. In the unit micro channel 135, a plurality of micro channels 136 communicate with each other and are arranged side by side.

In addition, the first distribution plate 130 may have a cathode electrolytic solution supply hole 137 connected to and communicated with the plurality of micro channels 136 of the unit micro channel 135 to supply a cathode electrolytic solution ($KHCO_3$ solution). In other words, the cathode electrolytic solution ($KHCO_3$ solution) is supplied and diverged through the cathode electrolytic solution supply hole 137, so that the cathode electrolytic solution ($KHCO_3$ solution) may be supplied to the plurality of micro channels 136 of a single unit micro channel 135.

Also, a plurality of micro channels 136 provided in one unit micro channel 135 and a plurality of micro channels 136 provided in another unit micro channel 135 may be alternately arranged.

Meanwhile, the cathode electrolytic solution ($KHCO_3$ solution) dissolved with the reaction gas ($CO_2$) is supplied from one side of each micro channel 136 and is accommodated in the micro channel 136. As described above, the micro channel 136 according to this embodiment has an inlet through which the cathode electrolytic solution ($KHCO_3$ solution) is supplied but does not have an outlet so that the cathode electrolytic solution ($KHCO_3$ solution) is accommodated in the micro channel 136. Thus, as shown in FIGS. 4 and 5, the cathode electrolytic solution ($KHCO_3$ solution) accommodated in the micro channel 136 sequentially penetrates the first catalyst layer 114 and the first gas diffusion layer 115 and diffuses toward an adjacent main channel 131, and then the cathode electrolytic solution encounters the reaction gas ($CO_2$) at the catalyst layer 114, which is in contact with the main channel 131, to form a three-phase interface.

In addition, in the first catalyst layer 114 in contact with the micro channels 136, the three-phase interface is formed by the cathode electrolytic solution ($KHCO_3$ solution) mixed with the reaction gas ($CO_2$).

Moreover, the main channel 131 is formed in a channel structure opened at one side which is in contact with the first catalyst layer 114. In this embodiment, the main channel 131 is continuously formed in a zigzag form along the plurality of micro channels 136 alternately arranged, and thus as shown in FIGS. 4 and 5, the micro channels 136 are disposed at both sides of the main channel 131, respectively.

As described above, the first distribution plate 130 accommodates the cathode electrolytic solution ($KHCO_3$ solution) in the micro channels 136, and the cathode electrolytic solution ($KHCO_3$ solution) accommodated in the micro channels 136 penetrates the first catalyst layer 114 and the first gas diffusion layer 115 and diffuses to an adjacent main channel 131, and then encounters the reaction gas ($CO_2$) at the catalyst layer 114, which is in contact with the main channel 131, to form a three-phase interface. Therefore, the three-phase interface where the cathode electrolytic solution ($KHCO_3$ solution) and the reaction gas ($CO_2$) encounter the first catalyst layer 114 may be maximized by means of the first distribution plate 130, and thus the production efficiency of carbon monoxide (CO) or the like due to the reduction reaction of carbon dioxide ($CO_2$) may be enhanced at the cathode 113.

In addition, the first distribution plate 130 includes a first supply hole 132 for supplying the reaction gas ($CO_2$) to the main channel 131, and a first discharge hole 133 through which a reaction gas ($CO_2$) not reacting at the first catalyst layer 114 and a cathode electrolytic solution ($KHCO_3$ solution) diffused from the micro channels 136 and put into the main channel 131 are mixed with a product gas (for example, hydrogen ($H_2$), carbon monoxide (CO), water ($H_2O$) or the like) generated at the first catalyst layer 114 and discharged. The carbon dioxide ($CO_2$) supplied from the first supply hole 132, the cathode electrolytic solution ($KHCO_3$ solution) diffused from the micro channels 136, and the product gas such as carbon monoxide (CO), hydrogen gas ($H_2$) and steam ($H_2O$) produced by the reaction of carbon dioxide ($CO_2$) and proton passing through the electrolytic membrane 111 are mixed and discharged through the main channel 131 to the first discharge hole 133.

In addition, a first end plate 170 is stacked on an outer side of the first distribution plate 130. The first end plate 170 is formed to communicate with the first supply hole 132, the first discharge hole 133 and the cathode electrolytic solution supply hole 137 of the first distribution plate 130 to supply a reaction gas ($CO_2$) and a cathode electrolytic solution ($KHCO_3$ solution) dissolved with the reaction gas ($CO_2$). Also, the carbon dioxide ($CO_2$), the cathode electrolytic solution ($KHCO_3$ solution), carbon monoxide (CO), hydrogen gas ($H_2$), steam ($H_2O$) and the like discharged along the main channel 131 are discharged in a mixed state.

Meanwhile, the first sealing member 160 (for example, a gasket or the like) is provided between the first distribution plate 130 and the membrane 111, and the first sealing member 160 seals the first distribution plate 130 and the first catalyst layer 114 from each other in order to prevent that the reaction gas ($CO_2$), the cathode electrolytic solution ($KHCO_3$ solution) and the like flowing along the main channel 131 and the plurality of micro channels 136 are leaked out of the cell.

In addition, in this embodiment, the anode 117 includes a second catalyst layer 118 stacked on the other side of the electrolytic membrane 111 and a second gas diffusion layer 119 stacked on the second catalyst layer 118 sequentially. In other words, in this embodiment, in the anode 117, the second catalyst layer 118 and the second gas diffusion layer 119 are sequentially stacked on the other side of the electrolytic membrane 111.

The second catalyst layer 118 according to this embodiment may be any one selected from the group consisting of iridium, iridium dioxide, silver, gold, platinum, palladium, and mixtures thereof.

In addition, the second gas diffusion layer 119 according to this embodiment may be made of a titanium sintered foam material or a titanium sintered foam material coated with an iridium oxide ($IrO2$) catalyst.

The porous structure used for the second gas diffusion layer 119 includes, for example, porous fiber (porous cloth), porous paper, mesh, foam and the like, and the material may be carbon, titanium, nickel, gold, silver or the like.

In addition, the second distribution plate 150 is stacked on the second gas diffusion layer 119 to supply an anode electrolytic solution (for example, a KOH solution or the like) to the second gas diffusion layer 119.

As shown in FIG. 6, the second distribution plate 150 includes a second supply hole 152 through which the anode electrolytic solution (KOH solution) is supplied, a second discharge hole 153 through which an unreacted anode electrolytic solution (KOH solution) and generated oxygen are discharged, and a channel 151 connecting the second supply hole 152 and the second discharge hole 153 to communicate with each other so that the anode electrolytic solution flows therein.

Here, the channel 151 is formed in a channel structure opened at one side which is in contact with the second gas diffusion layer 119. In addition, the channel 151 is formed continuously in a serpentine form.

The anode electrolytic solution (KOH solution) is supplied to the channel 151 through the second supply hole 152, and the anode electrolytic solution supplied to the channel 151 is diffused by penetrating the second gas diffusion layer 119 and then supplied to the second catalyst layer 118. In the second catalyst layer 118, the proton generated after the reaction passes through the electrolytic membrane 111 and moves toward the first gas diffusion layer 115, and the oxygen gas ($O_2$) generated after the reaction and the unreacted anode electrolytic solution (KOH solution) are discharged through the second discharge hole 153.

In addition, a second end plate 175 is stacked on an outside of the second distribution plate 150. The second end plate 175 is formed to communicate with the second supply hole 152 and the second discharge hole 153 of the second distribution plate 150 to supply the anode electrolytic solution to the second distribution plate 150. Also, the oxygen gas ($O_2$) discharged along the channel 151 and the unreacted anode electrolytic solution (KOH solution) are discharged in a mixed state.

Meanwhile, a second sealing member 165 (for example, a gasket or the like) is provided between the second distribution plate 150 and the membrane 111, and the second sealing member 165 seals the second distribution plate 150 and the second gas diffusion layer 119 from each other in order to prevent that the anode electrolytic solution (KOH solution) or the like flowing along the channel 151 is leaked out of the cell.

The electrochemical reaction cell 100 enhancing a reduction reaction according to an embodiment of the present disclosure will be described in comparison with comparative examples.

Figure 7A:
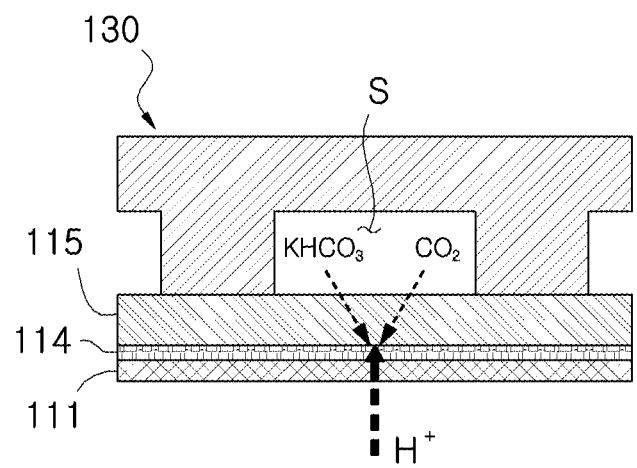
FIGS. 7A to 7F are diagram views showing cathodes according to the present disclosure and comparative examples.
Figure 7B:
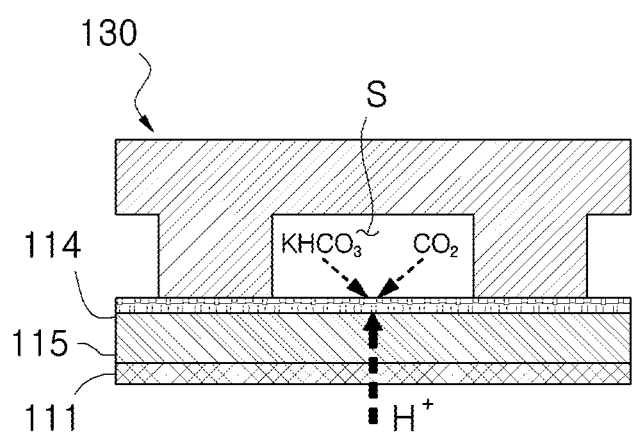
Figure 7C:
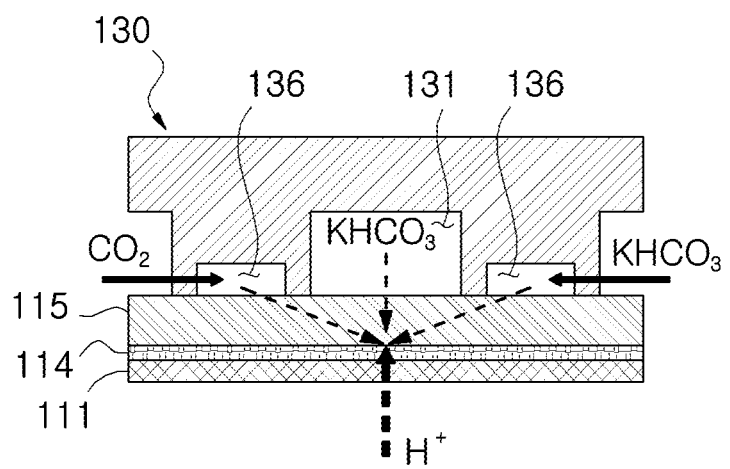
Figure 7D:
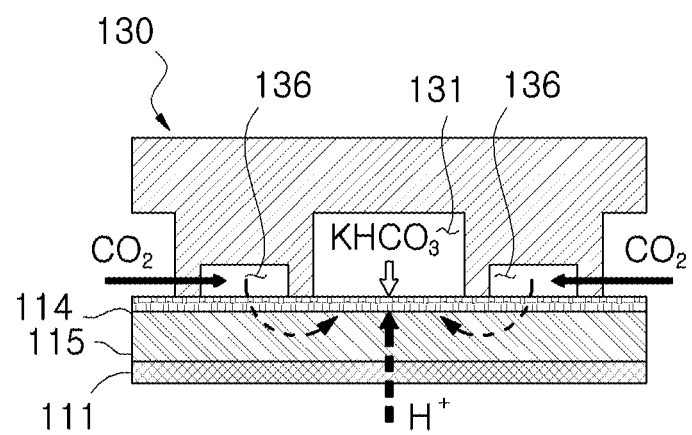
Figure 7E:
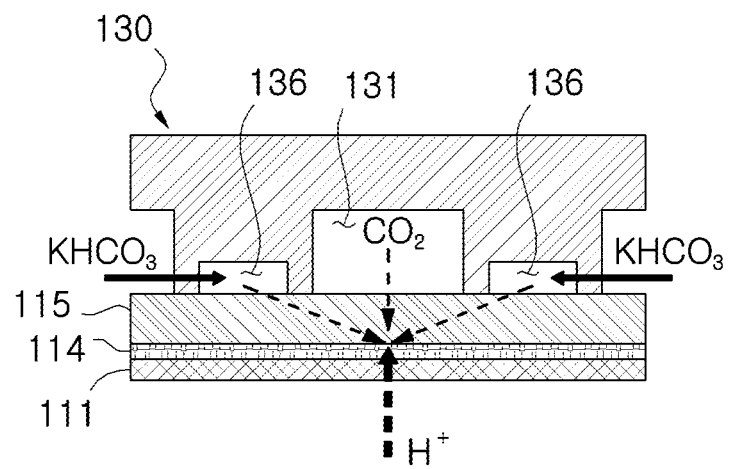
Figure 7F:
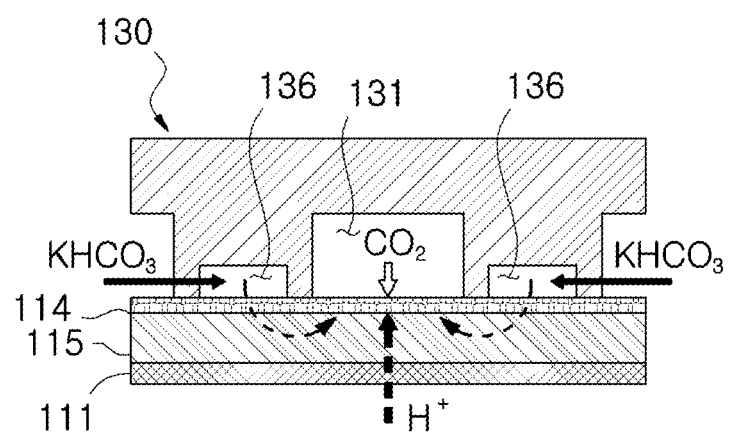
Figure 8A:
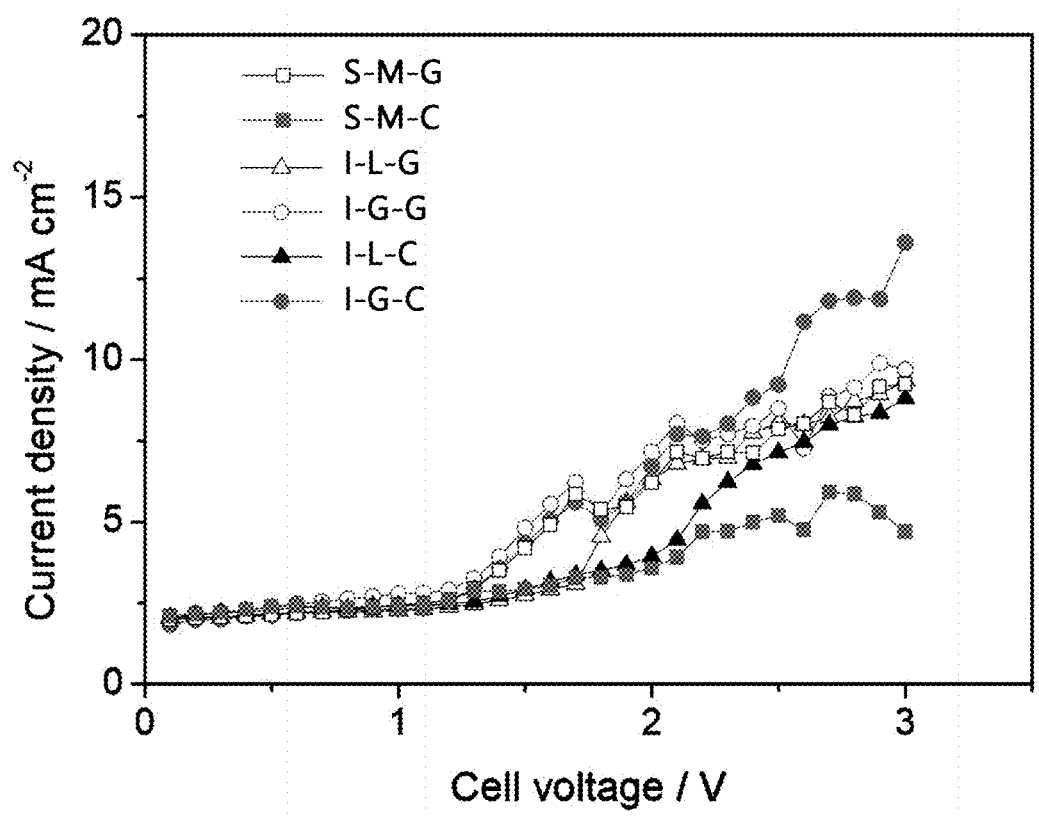
FIG. 8A is a graph showing the relationship between a voltage and a current density when the cathodes according to the present disclosure and the comparative examples are used.
Figure 8B:
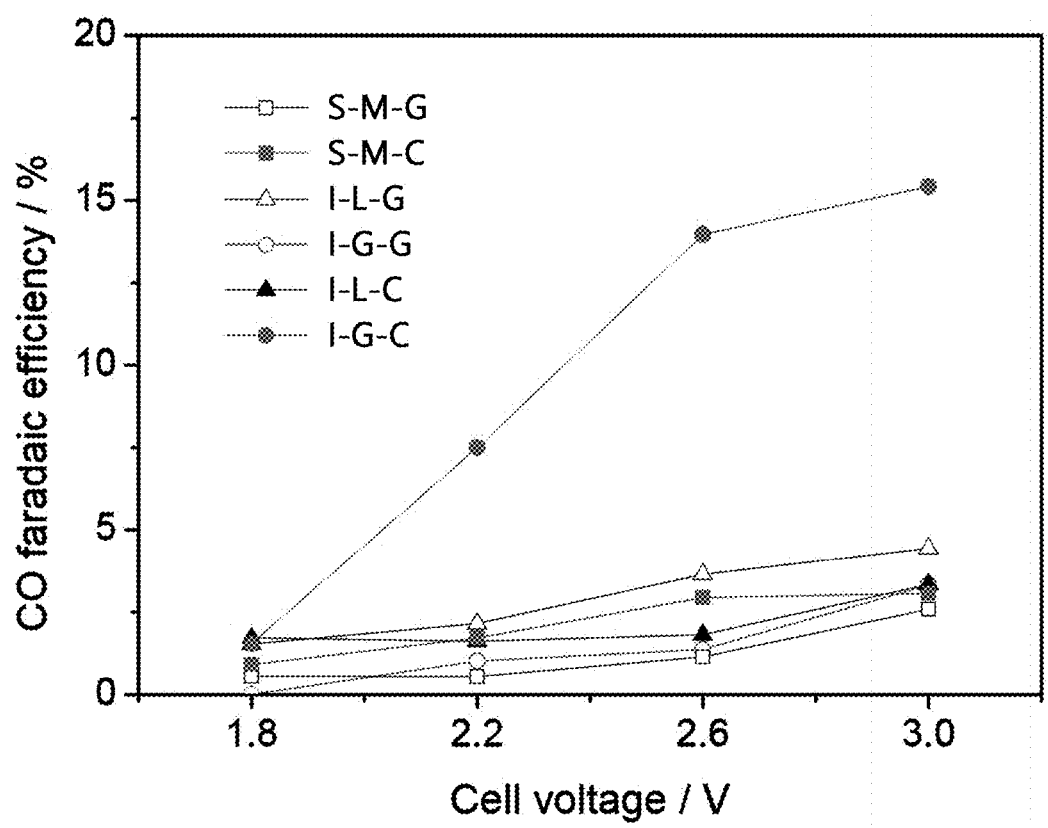
FIG. 8B is a graph showing a measured amount of carbon monoxide generated at each voltage when the cathodes according to the present disclosure and the comparative examples are used.
Figure 9:
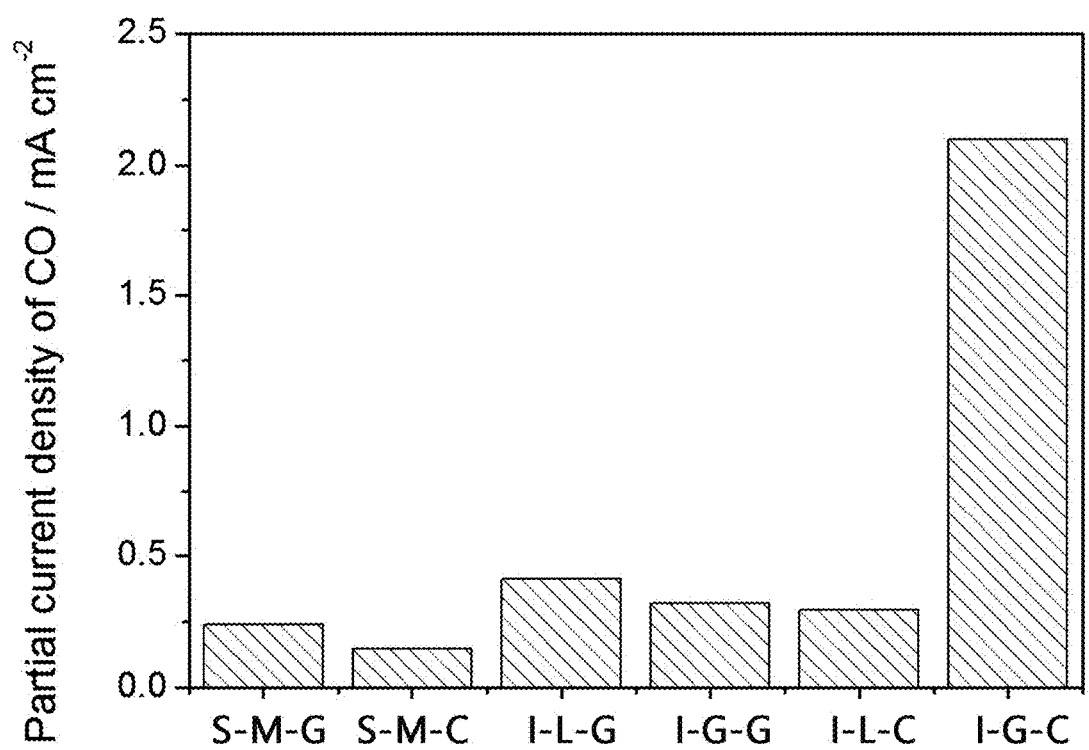
FIG. 9 is a graph showing an amount of carbon monoxide at a specific voltage (3.0V), which is converted into a used current, when the cathodes according to the present disclosure and the comparative examples are used.

FIG. 7 is a diagram view showing cathodes according to the present disclosure and comparative examples, FIG. 8A is a graph showing the relationship between a voltage and a current density when the cathodes according to the present disclosure and the comparative examples are used, FIG. 8B is a graph showing a measured amount of carbon monoxide generated at each voltage when the cathodes according to the present disclosure and the comparative examples are used, FIG. 9 is a graph showing an amount of carbon monoxide at a specific voltage (3.0V), which is converted into a used current, when the cathodes according to the present disclosure and the comparative examples are used, and FIG. 10 is a diagram schematically showing the flow of a cathode electrolytic solution and a reaction gas in an electrochemical reaction cell stack in which a plurality of electrochemical reaction cells according to the present disclosure are stacked.

FIG. 7 shows the cathode 113 according to the present disclosure and cathodes 113 according to comparative examples. The cathodes 113 of the electrochemical reaction cell 100 are different from each other in view of channel structures, supply methods of the reaction gas ($CO_2$) and the cathode electrolytic solution ($KHCO_3$ solution), and locations of the first catalyst layer 114 and the first gas diffusion layer 115, respectively. In addition, the other configurations of the electrochemical reaction cell 100 are in the same manner.

FIG. 7(A) shows a structure where a reaction gas ($CO_2$) and a cathode electrolytic solution ($KHCO_3$ solution) are mixed and supplied to in a single channel S, and the first catalyst layer 114 is present between the first gas diffusion layer 115 and the electrolytic membrane 111 (for example, the cation exchange membrane) (S-M-G), FIG. 7(B) shows a structure where a reaction gas ($CO_2$) and a cathode electrolytic solution ($KHCO_3$ solution) are mixed and supplied to a single channel S, and the first gas diffusion layer 115 is present between the first catalyst layer 114 and the electrolytic membrane 111 (S-M-C), FIG. 7(C) shows a structure where a cathode electrolytic solution ($KHCO_3$ solution) is supplied to the main channel 131, a reaction gas ($CO_2$) is supplied to the micro channels 136 provided at both sides of the main channel 131, and first catalyst layer 114 is present between the first gas diffusion layer 115 and the electrolytic membrane 111 (I-L-G), FIG. 7(D) shows a structure where a cathode electrolytic solution ($KHCO_3$ solution) is supplied to the main channel 131, a reaction gas ($CO_2$) is supplied to the micro channels 136 provided at both sides of the main channel 131, and the first gas diffusion layer 115 is present between the first catalyst layer 114 and the electrolytic membrane 111 (I-L-C), FIG. 7(E) shows a structure where a reaction gas ($CO_2$) is supplied to the main channel 131, a cathode electrolytic solution ($KHCO_3$ solution) is supplied to the micro channels 136 provided at both sides of the main channel 131, and the first catalyst layer 114 is present between the first gas diffusion layer 115 and the electrolytic membrane 111 (I-G-G), and FIG. 7(F) shows a structure where a reaction gas ($CO_2$) is supplied to the main channel 131, a cathode electrolytic solution ($KHCO_3$ solution) is supplied to the micro channels 136 provided at both sides of the main channel 131, and the first gas diffusion layer 115 is present between the first catalyst layer 114 and the electrolytic membrane 111 (I-G-C). Here, FIG. 7(F) shows the cathode 113 according to the present embodiment.

Meanwhile, FIG. 8(A) is a graph showing the relationship between a voltage and a current density when the cathodes 113 according to the present disclosure and the comparative examples are used.

In the comparative examples having the structures of FIG. 7(A) and FIG. 7(B), a reaction gas ($CO_2$) was allowed to flow in a cathode electrolytic solution ($KHCO_3$ solution) to be mixed thereto, and was then mixed with a reaction gas ($CO_2$) and supplied to a single channel S. Then, the relationship between a voltage and a current density was analyzed while raising the voltage between the anode 117 and the cathode 113 from 0V to 1.8V, by 0.1V per minute.

In addition, in the comparative examples having the structures of FIG. 7(C) to FIG. 7(E) and the example of the present disclosure having the structure of FIG. 7(F), a reaction gas ($CO_2$) was allowed to flow in a cathode electrolytic solution ($KHCO_3$ solution) to be saturated, and then the cathode electrolytic solution ($KHCO_3$ solution) mixed with the reaction gas ($CO_2$) was supplied to the main channel 131 or the micro channels 136, separately from the reaction gas ($CO_2$). Then, the relationship between a voltage and a current density was analyzed while raising the voltage between the anode 117 and the cathode 113 from 0V to 1.8V, by 0.1V per minute.

FIG. 8(B) is a graph showing an amount of carbon monoxide generated at each voltage according to the carbon dioxide reduction efficiency when the cathodes 113 according to the present disclosure and the comparative examples as depicted in FIG. 7 are used.

The CO faradaic efficiency represents a ratio of current involved in the reaction to produce carbon monoxide (CO), among the current involved in the entire electrochemical reaction. The higher the CO faradaic efficiency, the higher the production rate of carbon monoxide (CO), instead of hydrogen ($H_2$), and thus the production efficiency of carbon monoxide (CO) is enhanced. In other words, the higher the CO faradaic efficiency, which means the selectivity of carbon monoxide (CO) conversion, the higher the carbon dioxide ($CO_2$) reduction efficiency and the higher the carbon monoxide (CO) production. Since the CO faradaic efficiency is high in the cathode 113 (I-G-C in FIG. 7(F)) according to the example of the present disclosure as shown in FIG. 8(B), the carbon dioxide ($CO_2$) reduction efficiency is most excellent.

In the comparative examples having the structures of FIG. 7(A) and FIG. 7(B) and the example of the present disclosure having the structure of FIG. 7(F), produced carbon monoxide (CO) is analyzed while applying a voltage at 1.8 V for 30 minutes in a normal state, then produced carbon monoxide (CO) is analyzed while raising the voltage to 2.2 V by 0.1 V per minute, and produced carbon monoxide (CO) was analyzed at 2.6V and 3.0V. In other words, in FIG. 8(B), the relationship between the CO faradaic efficiency and the voltage is analyzed in the comparative examples having the structures of FIG. 7(A) and FIG. 7(B) and the example of the present disclosure having the structure of FIG. 7(F).

In addition, in FIG. 8(A) and FIG. 8(B), 0.5M KOH solution is supplied to the anode 117 at 10 mL/min, and for the cathode 113, carbon dioxide ($CO_2$) at 10 mL/min and 0.5M $KHCO_3$ solution at 10 mL/min mixed with carbon dioxide ($CO_2$) are mixed and supplied to a single channel or are separately supplied to the main channel 131 or the micro channels 136. In addition, currents of the anode 117 and the cathode 113 were measured while maintaining a specific voltage by using a power supply device, and among the reactants generated in the cathode 113, only gas was separated and the content of carbon monoxide (CO) was analyzed by a gas analyzer.

As in the graph of FIG. 8(A), in case of the cathode 113 (I-G-C in FIG. 7(F)) according to the example of the present disclosure, the current density is highest at a specific voltage of 3.0 V, and accordingly, as shown in FIG. 8(B), the amount of produced carbon monoxide (CO) is also greatest since the carbon dioxide ($CO_2$) reduction efficiency is enhanced.

In addition, FIG. 9 is a graph in which the amount of carbon monoxide (CO) generated at a specific voltage (3.0 V) is converted into a used current.

A partial current density of CO represents an amount of current which reduces carbon dioxide ($CO_2$), among the current applied to the electrochemical reaction cell. The higher the partial current density of CO, the greater the amount of carbon dioxide ($CO_2$) per unit area.

Seeing FIG. 9, in case of the cathode 113 (I-G-C in FIG. 7(F)) according to the example of the present disclosure, the partial current density of CO is highest at a specific voltage of 3.0 V, and accordingly, in the cathode 113 (I-G-C in FIG. 7(F)) according to the example of the present disclosure, the amount of carbon monoxide (CO) per unit area is greatest. Thus, carbon dioxide ($CO_2$) is reduced greatest among cells to which the same catalyst is loaded, and thus it is possible to fabricate a cell with low cost and small size.

Figure 10A:
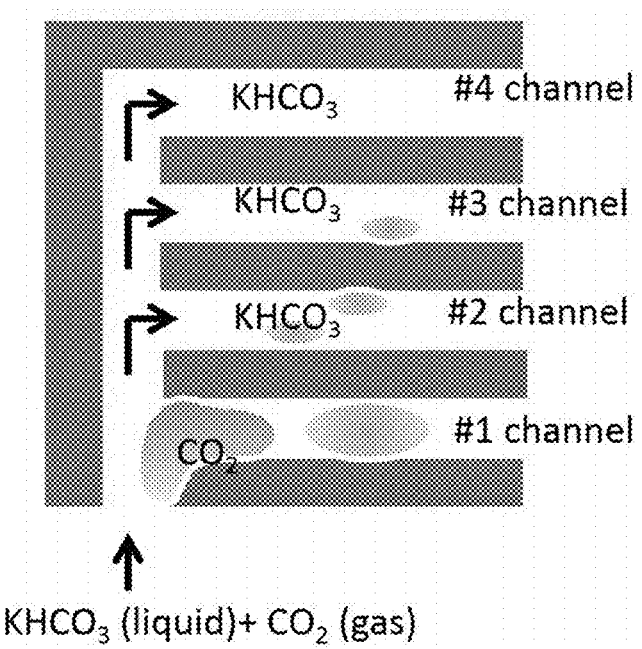
FIGS. 10A and 10B are diagrams schematically showing the flow of a cathode electrolytic solution and a reaction gas in an electrochemical reaction cell stack in which a plurality of electrochemical reaction cells according to the present disclosure are stacked.
Figure 10B:
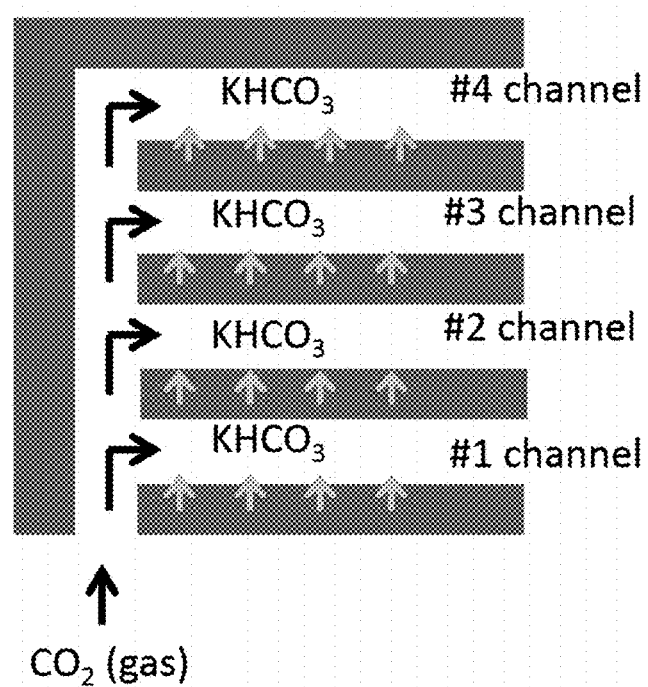

Meanwhile, FIG. 10 is a diagram conceptually showing a ratio of the cathode electrolytic solution ($KHCO_3$ solution) and the reaction gas ($CO_2$) supplied to each electrochemical reaction cell 100 when an electrochemical reaction cell stack (fuel cell stack) is fabricated by stacking a plurality of electrochemical reaction cells 100, for the case where the cathode electrolytic solution ($KHCO_3$ solution) and the reaction gas ($CO_2$) are mixed and supplied to the cathode 113 (FIG. 10(A)) and the case where they are divided and separately supplied (FIG. 10(B)).

If the cathode electrolytic solution ($KHCO_3$ solution) and the reaction gas ($CO_2$) are mixed and supplied to the cathode 113 as in the existing techniques of FIG. 10(A), the ratio of the cathode electrolytic solution ($KHCO_3$ solution) and the reaction gas ($CO_2$) supplied to each electrochemical reaction cell 100 may be changed. However, if the cathode electrolytic solution ($KHCO_3$ solution) and the reaction gas ($CO_2$) are divided and separately supplied as in the example of the present disclosure in FIG. 10(B), the ratio of the cathode electrolytic solution ($KHCO_3$ solution) and the reaction gas ($CO_2$) supplied to each electrochemical reaction cell 100 may be always maintained consistently.

Therefore, in the example of the present disclosure, in an electrochemical reaction cell stack (fuel cell stack) in which a plurality of electrochemical reaction cells 100 are stacked, the reaction gas ($CO_2$) and the cathode electrolytic solution ($KHCO_3$ solution) dissolved with the reaction gas ($CO_2$) may be uniformly supplied to the first distribution plate 130 of the cathode 113 along a separately formed channel, thereby improving the efficiency of the electrochemical reaction cell stack.

The present disclosure is not limited to the above embodiments but may be changed or modified in various ways without departing from the features and scope of the present disclosure, as apparent to those skilled in the art. Therefore, such modifications or variations are intended to fall within the scope of the claims of the present disclosure.

REFERENCE SIGNS

| | |
|---|---|
| 100: electrochemical reaction cell | 110: membrane electrode assembly |
| 111: electrolytic membrane | 113: cathode |
| 114: first catalyst layer | 115: first gas diffusion layer |
| 117: anode | 118: second catalyst layer |
| 119: second gas diffusion layer | 130: first distribution plate |
| 131: main channel | 136: micro channel |
| 137: cathode electrolytic solution supply hole | 150: second distribution plate |
| 151: fuel channel | 160: first sealing member |
| 165: second sealing member | 170: first end plate |
| 175: second end plate | |

What is claimed is:

1. An electrochemical reaction cell enhancing a reduction reaction, comprising:
a membrane electrode assembly including an electrolytic membrane, a cathode formed by sequentially stacking a first gas diffusion layer and a first catalyst layer on a first surface of the electrolytic membrane, and an anode formed by sequentially stacking a second catalyst layer and a second gas diffusion layer on a second surface of the electrolytic membrane;
a first distribution plate stacked on the first catalyst layer to supply a reaction gas and a cathode electrolytic solution dissolved with the reaction gas to the first catalyst layer along separate channels, so that the cathode electrolytic solution penetrates and diffuses the first catalyst layer and the first gas diffusion layer to encounter the reaction gas at the first catalyst layer which is in contact with the channel to which the reaction gas is supplied to form a three-phase interface; and
a second distribution plate stacked on the second gas diffusion layer to supply an anode electrolytic solution to the second gas diffusion layer.

2. The electrochemical reaction cell enhancing a reduction reaction according to claim 1,
wherein the first distribution plate includes:
a plurality of micro channels arranged to cross each other in a latch form so that the cathode electrolytic solution is supplied thereto and accommodated therein, the micro channels being opened at one side which is in contact with the first catalyst layer; and
a main channel continuously formed between the plurality of micro channels in a zigzag form so that the reaction gas flows therein, the main channel being opened at one side which is in contact with the first catalyst layer,
wherein the cathode electrolytic solution accommodated in the micro channels penetrates through the first catalyst layer and the first gas diffusion layer and diffuses to the main channel adjacent thereto, and then encounters the reaction gas at the first catalyst layer to form a three-phase interface.

3. The electrochemical reaction cell enhancing a reduction reaction according to claim 2,
wherein the first gas diffusion layer is made of titanium sintered foam.

4. The electrochemical reaction cell enhancing a reduction reaction according to claim 2,
wherein the first gas diffusion layer is made of titanium sintered foam coated with a silver (Ag) catalyst.

5. The electrochemical reaction cell enhancing a reduction reaction according to claim 1, further comprising:

a first sealing member provided between the first distribution plate and the membrane to seal the first distribution plate and the first catalyst layer from each other.

6. The electrochemical reaction cell enhancing a reduction reaction according to claim 1,
   wherein the second distribution plate includes a channel continuously formed in a zigzag form so that the anode electrolytic solution flows therein, the channel being opened at one side which is in contact with the second gas diffusion layer, and
   wherein the anode electrolytic solution penetrates and diffuses through the second gas diffusion layer and then is supplied to the second catalyst layer.

7. The electrochemical reaction cell enhancing a reduction reaction according to claim 5,
   wherein the second gas diffusion layer is made of titanium sintered foam.

8. The electrochemical reaction cell enhancing a reduction reaction according to claim 5,
   wherein the second gas diffusion layer is made of titanium sintered foam coated with an iridium oxide (IrO2) catalyst.

9. The electrochemical reaction cell enhancing a reduction reaction according to claim 1, further comprising:
   a second sealing member provided between the second distribution plate and the membrane to seal the second distribution plate and the second gas diffusion layer from each other.

10. The electrochemical reaction cell enhancing a reduction reaction according to claim 1, further comprising:
   a first end plate stacked on an outer side of the first distribution plate to supply the reaction gas and the cathode electrolytic solution dissolved with the reaction gas to the first distribution plate and to discharge a product gas generated by reacting with a proton penetrating the electrolytic membrane along with an unreacted reaction gas and an unreacted cathode electrolytic solution; and
   a second end plate stacked on an outer side of the second distribution plate to supply the anode electrolytic solution to the second distribution plate and discharge an unreacted anode electrolytic solution.

* * * * *